(12) United States Patent
Johansen et al.

(10) Patent No.: US 7,013,407 B2
(45) Date of Patent: Mar. 14, 2006

(54) METHOD, APPARATUS, AND SYSTEM FOR HIGH SPEED DATA TRANSFER BETWEEN ELECTRONIC DEVICES

(75) Inventors: Henrik I. Johansen, Ballerup (DK); Franz Olbrich, Braunschweig (DE); Sebastian Steibl, Braunschweig (DE); Andreas Schulten, Braunschweig (DE)

(73) Assignee: Intel Corporation, Santa Clara, CA (US)

( * ) Notice: Subject to any disclaimer, the term of this patent is extended or adjusted under 35 U.S.C. 154(b) by 609 days.

(21) Appl. No.: 10/038,469

(22) Filed: Jan. 3, 2002

(65) Prior Publication Data

US 2003/0126489 A1 Jul. 3, 2003

(51) Int. Cl.
*G06F 1/04* (2006.01)

(52) U.S. Cl. ...................... 713/503; 713/401
(58) Field of Classification Search ............... 713/401, 713/503
See application file for complete search history.

(56) References Cited

U.S. PATENT DOCUMENTS 5,872,959 A * 2/1999 Nguyen et al. ............. 713/401
6,725,390 B1 * 4/2004 Liu et al. .................... 713/401

* cited by examiner

*Primary Examiner*—Thomas Lee
*Assistant Examiner*—Mark Connolly
(74) *Attorney, Agent, or Firm*—Blakely, Sokoloff, Taylor & Zafman LLP (57) ABSTRACT

According to one aspect of the invention, a method is provided in which a plurality of data signals are transmitted in parallel mode via a parallel bus from a first device to a second device. Phase information of each data signal received at the second device is detected against a corresponding clock signal. The phase information is sent from the second device to the first device. At the first device, an output delay of each data signal is adjusted based on the phase information received from the second device.

35 Claims, 6 Drawing Sheets

METHOD, APPARATUS, AND SYSTEM FOR HIGH SPEED DATA TRANSFER BETWEEN ELECTRONIC DEVICES

FIELD OF THE INVENTION

The present invention relates to the field of data communication and data transfer technology. More specifically, the present invention relates to a method, apparatus, and system for high speed data transfer between electronic devices.

BACKGROUND OF THE INVENTION

As computer devices and systems continue to advance and become more complex, effective and efficient techniques for transferring data between various components in data communication systems have become more and more critical in system design and implementation. Generally, in high speed data communication systems, it is desirable to transfer data in parallel form (e.g., via a parallel bus or parallel link) at the highest possible speed to allow a good trade off between the parallel width of the bus and the speed capabilities of the respective components. Current technologies allow data transfer between components at such high speeds that variations in distance between individual bits of a parallel bus may cause significant electrical skew of the bus. In general, current data communication systems or applications employ various techniques to accommodate delay variations in the round trip delay of the transmit path. However, traditional or conventional techniques only account for variations of one of the signals of a parallel bus (e.g., the transmit clock signal, etc.) but not for delay variations with respect to individual bits of a parallel bus. Accordingly, current methods or techniques to accommodate delay variations are not effective in high speed data communication systems where variations in distance between individual bits of a parallel bus may cause significant electrical skew of the bus.

BRIEF DESCRIPTION OF THE DRAWINGS

The features of the present invention will be more fully understood by reference to the accompanying drawings, in which.

DETAILED DESCRIPTION

In the following detailed description numerous specific details are set forth in order to provide a thorough understanding of the present invention. However, it will be appreciated by one skilled in the art that the present invention may be understood and practiced without these specific details.

Figure 1:
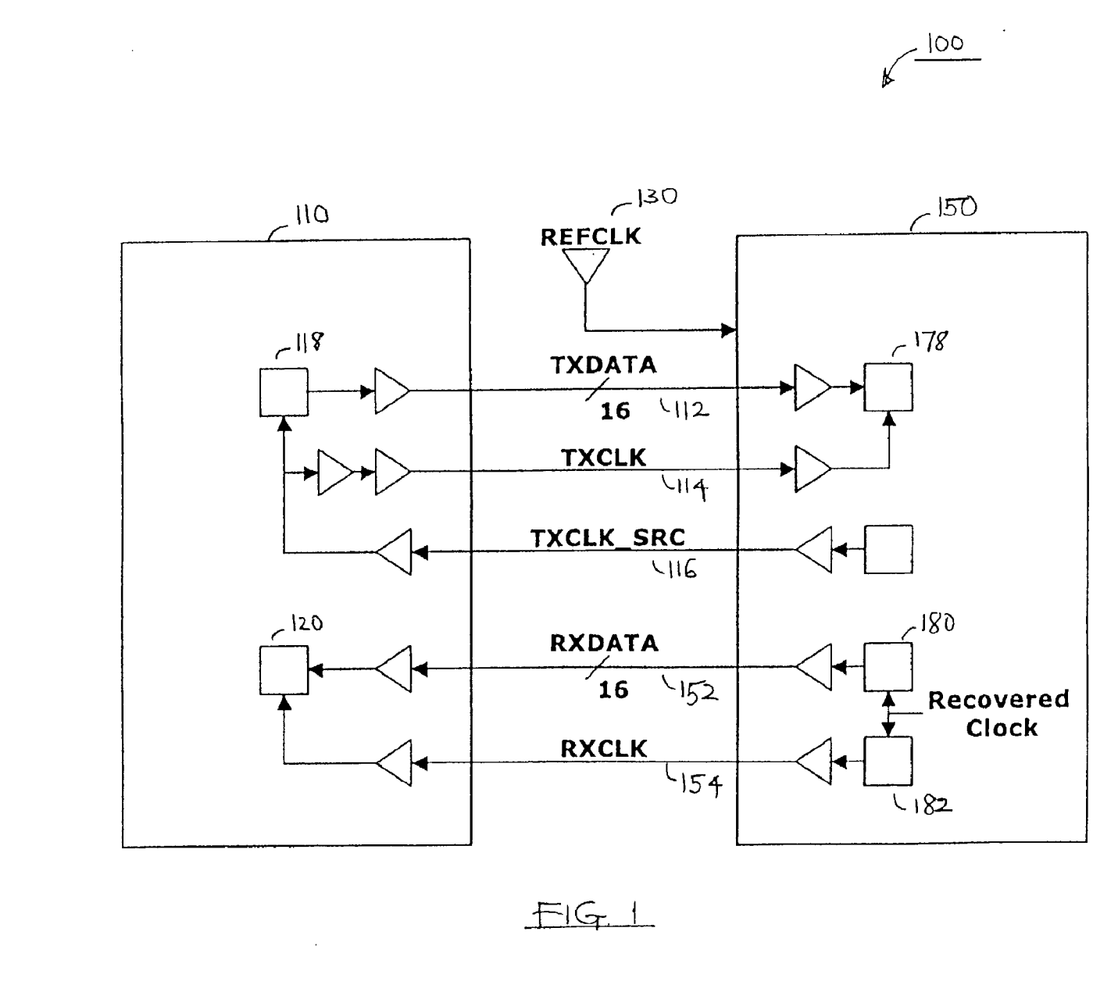
FIG. 1 shows a block diagram of a typical interface between two data communication components such as a synchronous optical network (SONET) framer and a serialization-deserialization (SERDES) device.

FIG. 1 shows a block diagram of a system 100 which includes a typical interface between two data communication components such as a synchronous optical network (SONET) framer 110 and a serialization-deserialization (SERDES) device 150. As shown in FIG. 1, data can be transmitted from the SONET framer 110 to the SERDES device 150 via the data path TXDATA 112. In this example, the TXDATA is 16-bit wide in parallel mode. The TXCLK signal 114 is the source synchronous clock for TXDATA and the TXCLK_SRC 116 is the reference clock from the SERDES device 150 to the SONET framer 110. Data can be transmitted from the SERDES device 150 to the SONET framer 110 via the data path RXDATA 152. In this example, the RXDATA is also 16-bit wide in parallel mode. The RXCLK 154 is a clock signal for RXDATA. In this example, the REFCLK 130 is a reference clock signal at the board level.

Figure 2:
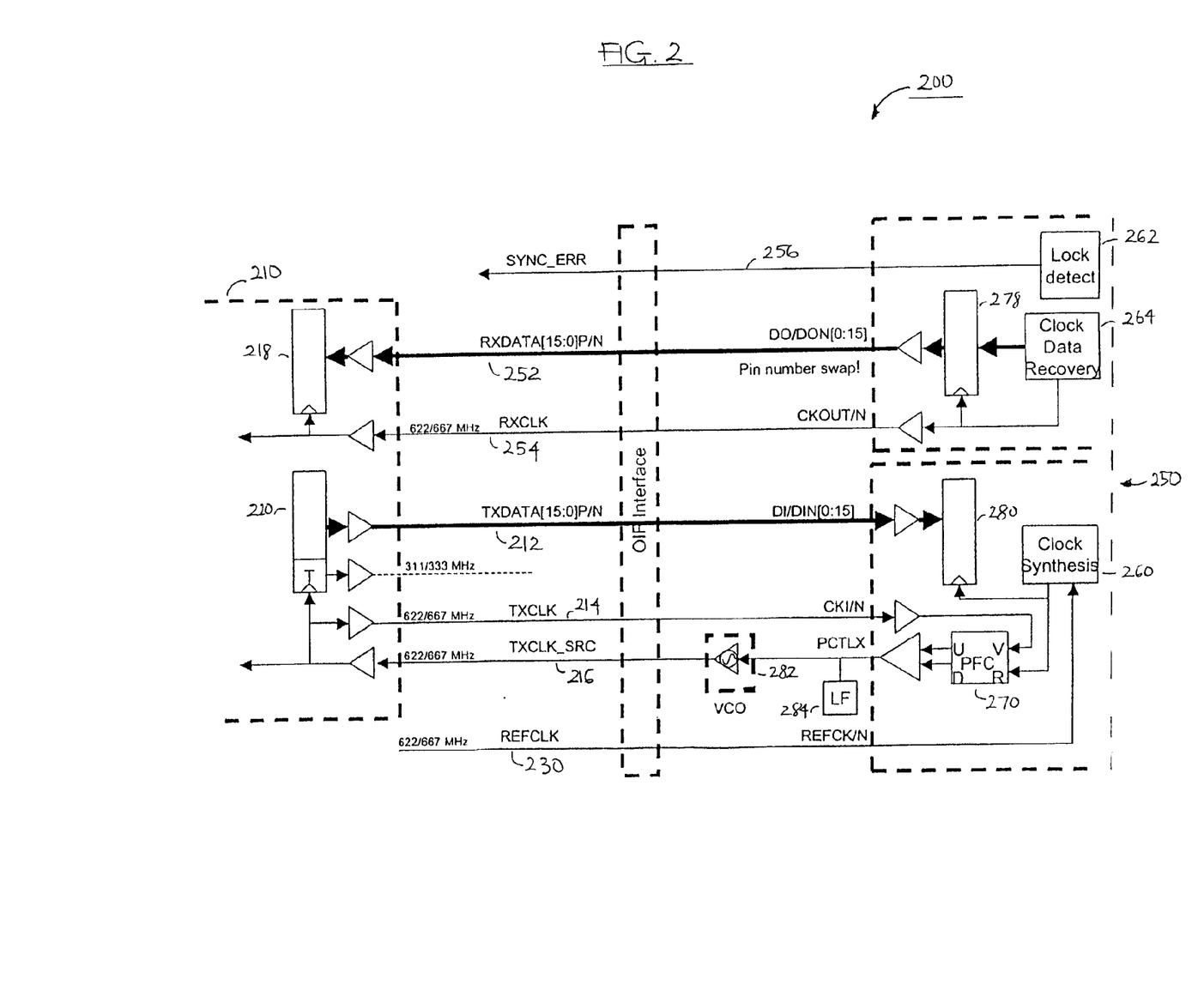
FIG. 2 illustrates a more detailed block diagram of a typical interface between a SONET framer and a SERDES device.

FIG. 2 illustrates a more detailed block diagram of a system 200 including a typical interface between two data communication devices (e.g., a SONET framer and a SERDES device). In this configuration, data are transmitted from the SONET device 210 to the SERDES device 250 via the data path TXDATA 212 which, in this example, is 16-bit wide. The RXDATA which is also 16-bit wide in this example is used for data transmission from the SERDES device 250 to the SONET framer 210. The TXCLK 214 is a source synchronous clock signal for TXDATA. The TXCLK_SRC 216 is a reference clock signal from the SERDES device 250 to the SONET framer 210. Delay variations in the round trip delay of the transmit data path (TXCLK_SRC to TXCLK) are accommodated using the clock synthesis unit 260 and the PFC unit 270. However, this only accounts for variations of one of the signals of a parallel bus, TXCLK in this example. This kind of delay adjustment is also called parallel delay adjustment herein. However, delay variations of individual bits are not accommodated or provided for the traditional systems or methods of data communications.

Figure 3:
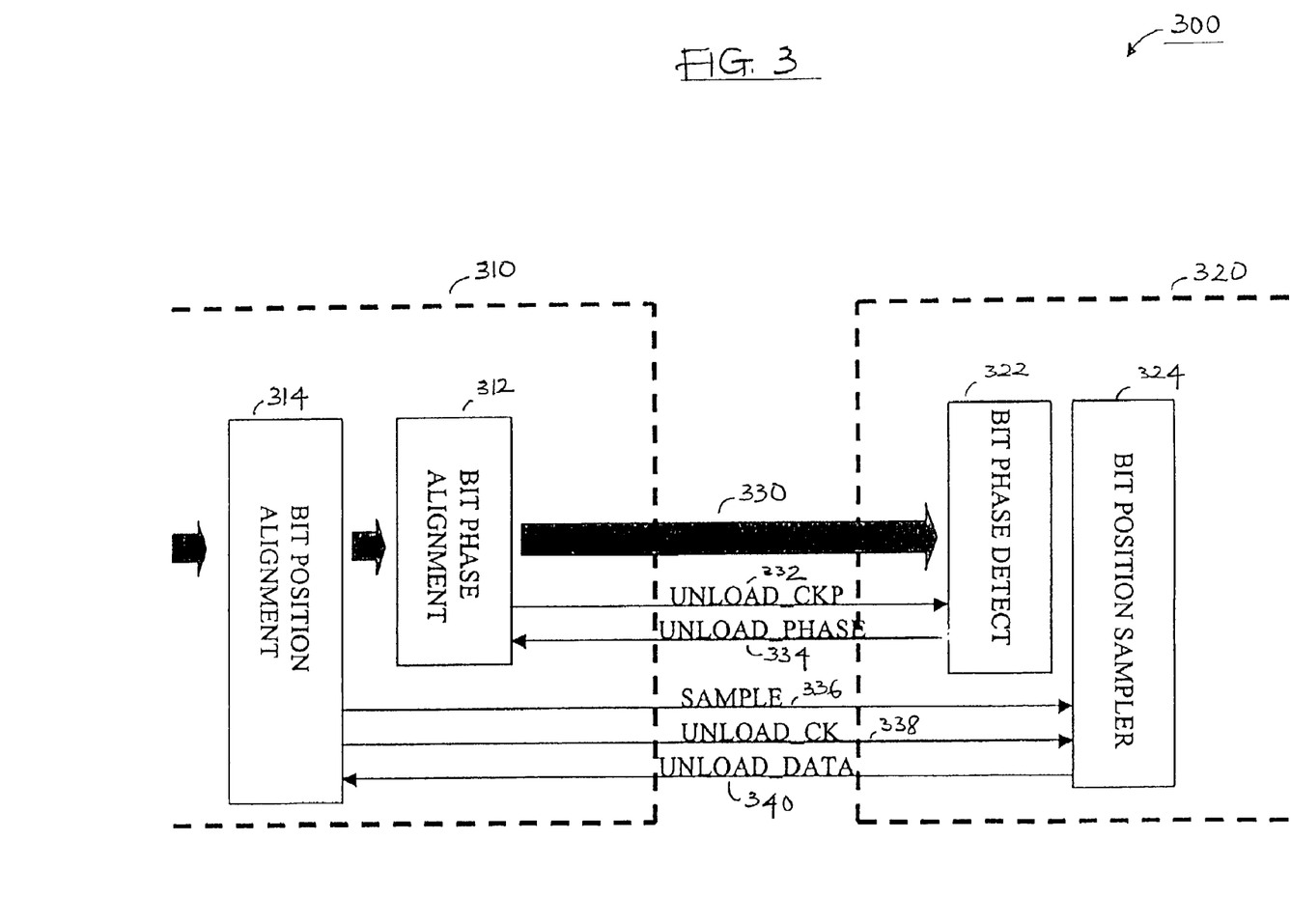
FIG. 3 shows a block diagram of one embodiment of a data communication apparatus/system according to the teachings of the present invention.

FIG. 3 shows a black diagram of one embodiment of a data communication apparatus/system 300 according to the teachings of the present invention. The system 300 as shown in FIG. 3 includes a first device 310 and a second device 320 that are configured to transfer data to each other. In one embodiment, the first device 310 is configured as a transmitter device and the second device 320 is configured as a receiver device. As an example, a transmitter device can be a SONET framer and a receiver device can be a SERDES device. It should be understood and appreciated by one skilled in the art that the teachings of the present invention are applicable to any system, apparatus, or method for data communication between two devices or components including those devices and components in optical networking technologies. In one embodiment, the first device 310 transmits data to the second device 320 in parallel mode via a parallel bus 330. For example, the first device 310 may be configured to transmit data to the second device 320 in form of data words with each data word containing a plurality of data bits (e.g., 8 bits, 16 bits, 32 bits, etc.). As shown in FIG. 3, the first device or transmitter 310 includes a circuit called bit phase alignment circuit 312 and a circuit called bit position alignment circuit 314. The second device or receiver 320 includes a circuit called bit phase detect circuit 322 and a circuit called bit position sampler circuit 324. In one embodiment, the bit phase detect circuit 324 is configured to individually detect the phase of each data bit against a companion parallel clock called UNLOAD_CKP 332. In one embodiment, the bit phase detect circuit 324 is configured to feed back the phase information detected with respect to the individual data bits to the first device or transmitter 310 via a signal path 334 (called UNLOAD_PHASE herein). In one embodiment, the bit phase detect circuit 324 serially feeds back the phase information to the corresponding bit phase alignment circuit 312. In one embodiment, the bit phase alignment circuit 312 is configured to individually adjust the output delay of each data bit being transmitted over the parallel bus 330, based upon the phase information received from the bit phase detect circuit 322. Thus, delay variations with respect to each individual data bit due to variations in distance between individual bits of the parallel data bus 330 can be adjusted or accommodated accordingly. In one embodiment, the bit position alignment circuit 314 is configured to transmit parallel data patterns (also called data samples or simply samples herein) to the bit position sampler circuit 324 in the second device 320, via a signal path 336 (called SAMPLE herein). In one embodiment, the bit position sampler circuit samples and holds the parallel data patterns received from the bit position alignment circuit 314, in response to a request or order by the bit position alignment circuit 314. In one embodiment, the bit position sampler circuit 324, after sampling the data patterns, feeds back the sampled data to the bit position alignment circuit 314 via a signal path 340 (called UNLOAD_DATA herein). In one embodiment, the sampled data can be fed back serially from the bit position sampler circuit 324 to the bit position alignment circuit 314. In one embodiment, upon detecting or recognizing phase variations that are in excess of one bit of the sampled data fed back from the bit position sampler circuit 324, the bit position alignment circuit 314 individually shifts data bit positions between parallel data words to align phase variations that are in excess of one bit interval. Accordingly, phase variations in excess of one bit interval are also adjusted.

Figure 4:
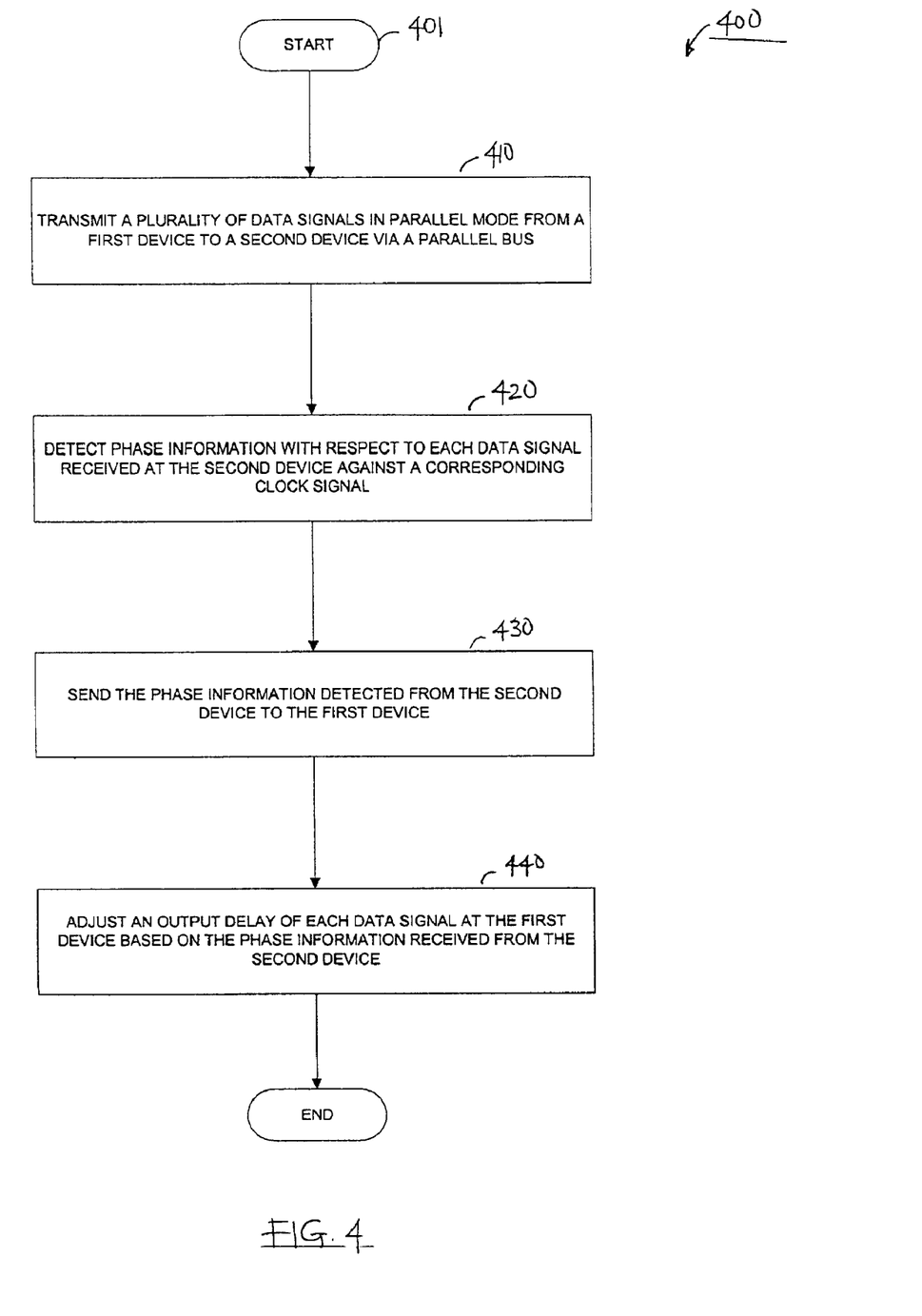
FIG. 4 shows a flow diagram of one embodiment for a data transfer method in accordance with the teachings of the present invention.

FIG. 4 shows a flow diagram of one embodiment for a data transfer method 400 in accordance with the teachings of the present invention. At block 410, a plurality of data signals are transmitted in parallel mode via a parallel bus from a first device (e.g., a transmitter component in a SONET framer) to a second device (e.g., a receiver component in a SERDES device). At block 420, phase information with respect to each data signal received at the second device is detected against a corresponding clock signal. At block 430, the phase information detected at the second device is sent from the second device to the first device. At block 440, an output delay of each data signal at the first device is adjusted based on the phase information received from the second device.

Figure 5:
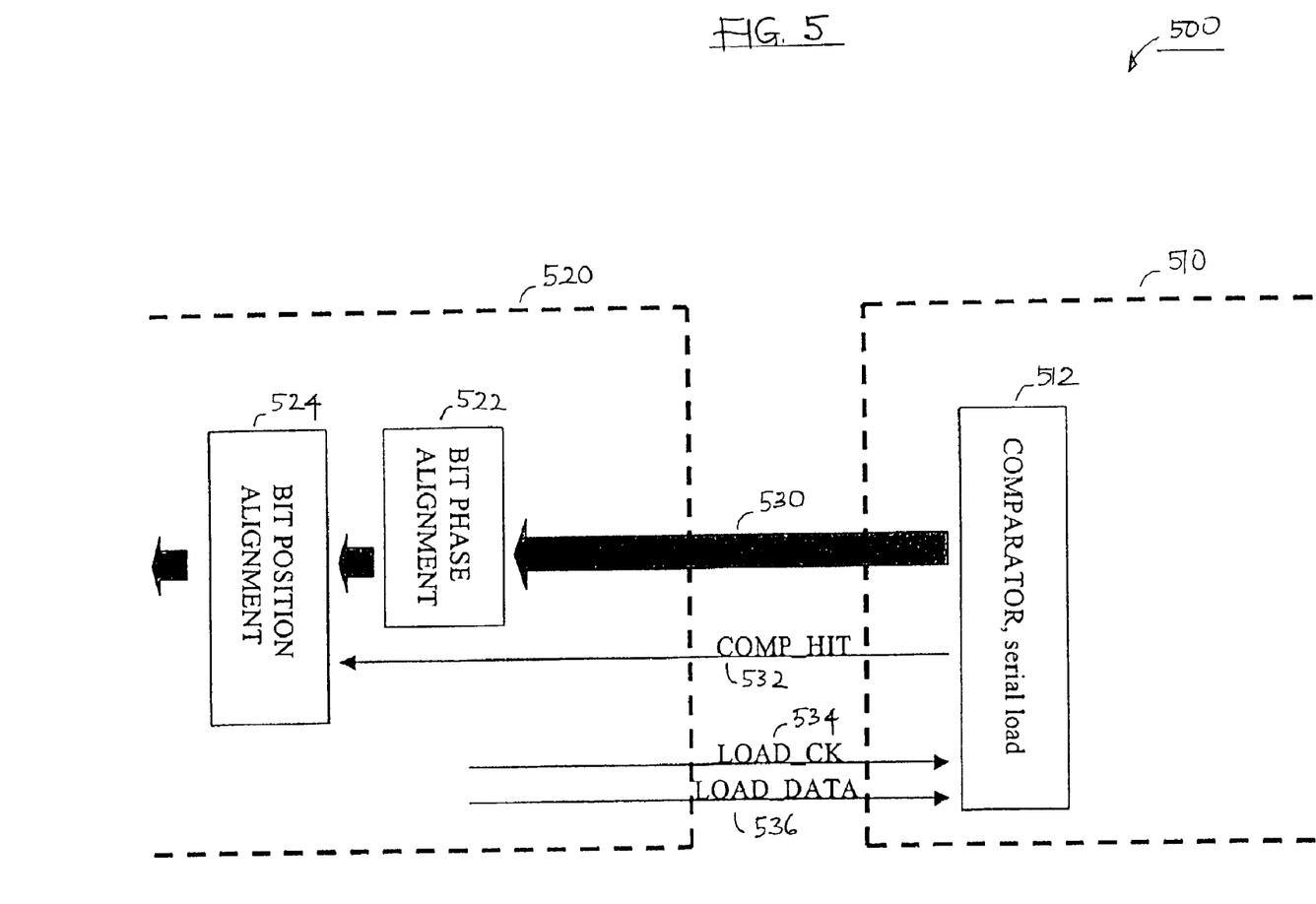
FIG. 5 shows a block diagram of another embodiment of a data communication apparatus/system according to the teachings of the present invention.

FIG. 5 shows a block diagram of another embodiment of a data communication system 500 according to the teachings of the present invention. The system 500 as shown in FIG. 5 includes a first device 510 and a second device 520 that are configured to transfer data to each other. In one embodiment, the first device 510 is configured as a transmitter device (e.g., a SERDES device) and the second device 520 is configured as a receiver device (e.g., a SONET framer). It should be understood and appreciated by one skilled in the art that the teachings of the present invention as discussed herein are applicable to any system, apparatus, or method for data communication between two devices or components including those devices and components in optical networking technologies. In one embodiment, the first device 510 transmits data to the second device 520 in parallel mode via a parallel bus 530. As an example, the first device 510 may be configured to transmit data to the second device 520 in form of data words with each data word having a plurality of data bits (e.g., 8 bits, 16 bits, 32 bits, etc.). As illustrated in FIG. 5, in one embodiment, the first device or transmitter 510 includes a circuit called comparator circuit 512. In one embodiment, the second device or receiver 520 includes a circuit called bit phase alignment circuit 522 and a circuit called bit position alignment circuit 524. In one embodiment, the comparator circuit 512 compares parallel data patterns (also called data samples or samples herein) received from the second device 520 via the signal path 536 (called LOAD_DATA) to a serially programmed parallel pattern. The comparator circuit 512 then outputs a signal 532 (called COMP_HIT herein) accompanying those data words being transmitted to the second device 520 that match the programmed pattern. In one embodiment, the bit phase alignment circuit 522 is configured to individually detect the phase of each data bit against a companion parallel clock (not shown) and to adjust the delay of the respective data received prior to sampling of the data. In one embodiment, the bit position alignment circuit 524 is configured to recognize or detect the phase variations that are in excess of one bit of the parallel data pattern when the comparator circuit 512 signals a match to the programmed pattern. In one embodiment, upon detecting or recognizing phase variations that are in excess of one bit of the parallel data pattern or sample, the bit position alignment circuit 514 individually shifts data bit positions between parallel data words to align phase variations that are in excess of one bit interval. Thus, delay variations with respect to each individual data bit due to variations in distance between individual bits of the parallel data bus 530 can be adjusted or accommodated accordingly.

Figure 6:
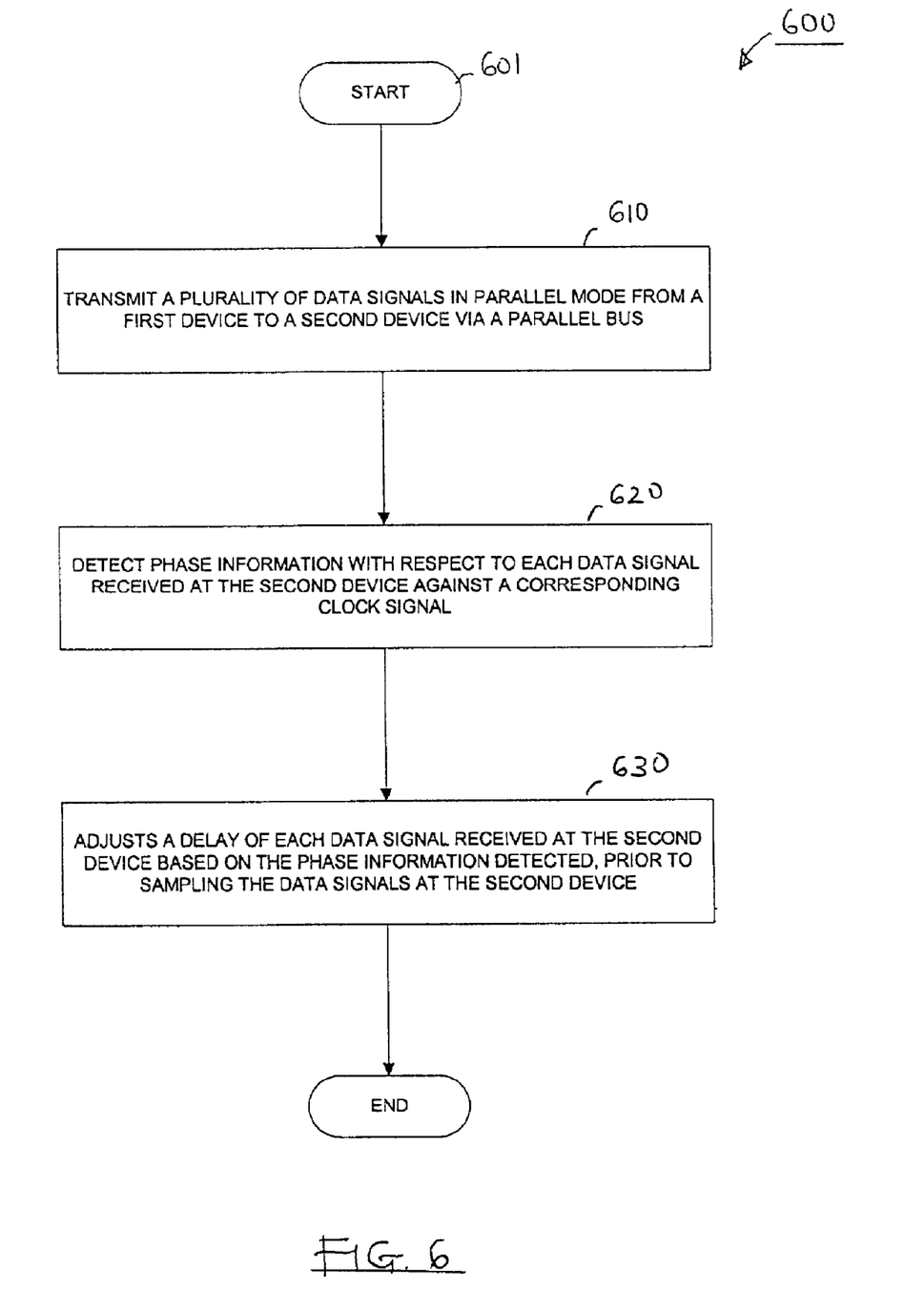
FIG. 6 shows a flow diagram of another embodiment of a data transfer method in accordance with the teachings of the present invention.

FIG. 6 shows a flow diagram of another embodiment of a data transfer method 600 in accordance with the teachings of the present invention. At block 610, a plurality of data signals are transmitted in parallel mode via a parallel bus from a first device (e.g., a transmitter component in a SERDES device) to a second device (e.g., a receiver component in a SONET framer). At block 620, phase information with respect to each data signal received at the second device is detected against a corresponding clock signal. At block 630, a delay of each respective data signal received at the second device is adjusted based on the phase information detected, prior to the sampling of the data signals at the second device.

The invention has been described in conjunction with the preferred embodiment. It is evident that numerous alternatives, modifications, variations and uses will be apparent to those skilled in the art in light of the foregoing description.

What is claimed is:

1. An apparatus comprising:
   a first device to transmit a plurality of data signals in a parallel mode; and
   a second device coupled to receive the plurality of data signals from the first device;
   wherein the second device detects phase information of each data signal against a corresponding clock signal and feeds back the phase information to the first device, the first device adjusts an output delay of each data signal based on the phase information fed back from the second device and the second device feeds back the phase information of the first device in a serial mode.

2. The apparatus of claim 1 wherein the second device samples parallel data patterns transmitted from the first device and feeds back the sampled data to the first device.

3. The apparatus of claim 2 wherein the second device samples the parallel data patterns in response to a first command signal from the first device.

4. The apparatus of claim 2 wherein the second device feeds back the sampled data to the first device in serial mode.

5. The apparatus of claim 1 wherein the first device detects phase variations that are in excess of one bit of the sampled data fed back from the second device and shifts data bit positions between parallel data words to align phase variations that are in excess of one bit interval.

6. An apparatus comprising:
a first device to transmit a plurality of data signals in a parallel format; and
a second device to receive the plurality of data signals from the first device,
wherein the second device detects phase information of each data signal with respect to a corresponding clock signal and adjusts a delay of the respective data signal based on the phase information detected prior to sampling of the data signals and the second device transmits parallel data sample to the first device, subsequent to the sampling of the data signals.

7. The apparatus of claim 6 wherein the first device, in response to receiving the parallel data sample from the second device, compares the parallel data sample to a programmed parallel data pattern.

8. The apparatus of claim 7 wherein the first device generates a signal to accompany data words being transmitted to the second device that match the programmed data pattern.

9. The apparatus of claim 8 wherein the second device, in response to the signal from the first device indicating a match to the programmed data pattern, recognizes phase variations that are in excess of one bit of the parallel data sample and shifts data bit positions between parallel data words to align phase variations that are in excess of one bit interval.

10. A method comprising:
transmitting a plurality of data signals in parallel mode from a first device to a second device over a first bus;
detecting phase information of each data signal received at the second device against a corresponding clock signal;
sending the phase information from the second device to the first device, wherein the phase information is sent from the second device to the first device in a serial mode; and
adjusting an output delay of each data signal at the first device based on the phase information received from the second device.

11. The method of claim 10 further including:
sampling and holding, at the second device, a parallel data pattern received from the first device;
feeding back the sampled data from the second device to the first device;
recognizing, at the first device, phase variations that are in excess of one bit of the sampled data fed back from the second device; and
shifting data bit positions between parallel words to align phase variations that are in excess of one bit interval.

12. A method comprising:
transmitting a plurality of data signals from a first device to a second device in a parallel mode over a first bus;
detecting, at the second device, phase information of each data signal with respect to a corresponding clock signal;
adjusting a delay of the respective data signal prior to sampling of the data signal at the second device;
sending a parallel data sample from the second device to the first device; and
upon receiving the parallel data sample at the first device, comparing the parallel data sample with a programmed parallel data pattern.

13. The method of claim 12 further including:
generating, from the first device, a signal to accompany data words being transmitted to the second device that match the programmed data pattern.

14. The method of claim 13 further including:
in response to the signal from the first device that indicates a match to the programmed data pattern, recognizing phase variations that are in excess of one bit of the parallel data sample; and
adjusting data bit positions between parallel data words to align phase variations that are in excess of one bit interval.

15. A system comprising:
a processor;
a first component coupled to the processor; and
a second component coupled to the first component, wherein the first component transmits data words to the second component in parallel mode, each data word including a plurality of data bits, wherein the second component detects phase information of each data bit relative to a corresponding clock signal and feeds back the phase information of each data bit to the first component, the first component adjusts an output delay of each data bit based on the phase information fed back from the second component, wherein the second component samples parallel data patterns received from the first component and feeds back the sampled data patterns to the first component.

16. The system of claim 15 wherein the first component, based on the sampled data patterns fed back from the second component, recognizes phase variations that are in excess of one bit of the sampled data patterns fed back from the second component and adjust data bit positions between parallel data words to align phase variations that are in excess of one bit interval.

17. The system of claim 15 wherein the first component receives data words from the second component in parallel mode, each data words including a plurality of data bits, and wherein the first component detects phase information of each data bit relative to a corresponding clock signal and adjusts a delay of the respective data bit based on the phase information detected prior to sampling of the data bits.

18. The system of claim 17 wherein the first component transmits parallel data sample to the second component subsequent to the sampling of the data bits.

19. The system of claim 18 wherein, upon receiving the parallel data sample from the first component, the second component compares the parallel data sample to a programmed parallel data pattern and generates a signal to accompany data words being transmitted to the first component that match the programmed data pattern.

20. A machine-readable medium comprising instructions which, when executed by a machine, cause the machine to perform operations including:
    transmitting a plurality of data signals in parallel mode from a first device to a second device over a first bus;
    detecting phase information of each data signal received at the second device against a corresponding clock signal;
    sending the phase information from the second device to the first device;
    adjusting an output delay of each data signal at the first device based on the phase information received from the second device;
    sampling and holding, at the second device, a parallel data pattern received from the first device;
    feeding back the sampled data from the second device to the first device;
    recognizing, at the first device, phase variations that are in excess of one bit of the sampled data fed back from the second device; and
    shifting data bit positions between parallel words to align phase variations that are in excess of one bit interval.

21. The machine-readable medium of claim 20 wherein the operations performed further including:
    transmitting a plurality of data signals from the second device to the first device in parallel mode;
    detecting, at the first device, phase information of each data signal with respect to a corresponding clock signal; and
    adjusting a delay of the respective data signal prior to sampling of the data signal at the first device.

22. The machine-readable medium of claim 21 wherein the operations performed further including:
    sending parallel data sample from the first device to the second device; and
    upon receiving the parallel data sample at the second device, comparing the parallel data sample with a programmed parallel data pattern.

23. The machine-readable medium of claim 22 wherein the operations performed further including:
    generating, from the second device, a signal to accompany data words being transmitted to the first device that match the programmed data pattern.

24. The machine-readable medium of claim 23 wherein the operations performed further including:
    in response to the signal from the second device that indicates a match to the programmed data pattern, recognizing phase variations that are in excess of one bit of the parallel data sample; and
    adjusting, at the first device, data bit positions between parallel data words to align phase variations that are in excess of one bit interval.

25. An apparatus comprising:
    a first device to transmit a plurality of data signals in a parallel mode; and
    a second device coupled to receive the plurality of data signals from the first device;
    wherein the second device detects phase information of each data signal against a corresponding clock signal and feeds back the phase information to the first device, the first device adjusts an output delay of each data signal based on the phase information fed back from the second device and the second device samples parallel data patterns transmitted from the first device and feeds back the sampled data to the first device.

26. The apparatus of claim 25 wherein the second device samples the parallel data patterns in response to a first command signal from the first device.

27. The apparatus of claim 25 wherein the second device feeds back the sampled data to the first device in serial mode.

28. The apparatus of claim 25 wherein the second device feeds back the phase information to the first device in serial mode.

29. An apparatus comprising:
    a first device to transmit a plurality of data signals in parallel mode; and
    a second device coupled to receive the plurality of data signals from the first device,
    wherein the second device detects phase information of each data signal against a corresponding clock signal and feeds back the phase information to the first device, the first device adjusts an output delay of each data signal based on the phase information fed back from the second device; and
    wherein the first device detects phase variations that are in excess of one bit of the sampled data fed back from the second device and shifts data bit positions between parallel data words to align phase variations that are in excess of one bit interval.

30. The apparatus of claim 29 wherein the second device feeds back the phase information to the first device in serial mode.

31. The apparatus of claim 29 wherein the second device samples parallel data patterns transmitted from the first device and feeds back the sampled data to the first device.

32. A method comprising:
    transmitting a plurality of data signals in parallel mode from a first device to a second device over a first bus;
    detecting phase information of each data signal received at the second device against a corresponding clock signal;
    sending the phase information from the second device to the first device;
    adjusting an output delay of each data signal at the first device based on the phase information received from the second device;
    sampling and holding, at the second device, parallel data pattern received from the first device;
    feeding back the sampled data from the second device to the first device;
    recognizing, at the first device, phase variations that are in excess of one bit of the sampled data fed back from the second device; and
    shifting data bit positions between parallel words to align phase variations that are in excess of one bit interval.

33. A system comprising:
    a processor;
    a first component coupled to the processor; and
    a second component coupled to the first component, wherein the first component transmits data words to the second component in parallel mode, each data word including a plurality of data bits, wherein the second component detects phase information of each data bit relative to a corresponding clock signal and feeds back the phase information of each data bit to the first component, the first component adjusts an output delay of each data bit based on the phase information fed back from the second component;
    wherein the first component receives data words from the second component in a parallel mode, each data words including a plurality of data bits, and wherein the first component detects phase information of each data bit relative to a corresponding clock signal and adjusts a delay of the respective data bit based on the phase information detected prior to sampling of the data bits.

34. The system of claim 33 wherein the first component transmits parallel data sample to the second component subsequent to the sampling of the data bits.

35. The system of claim 34 wherein, upon receiving the parallel data sample from the first component, the second component compares the parallel data sample to a programmed parallel data pattern and generates a signal to accompany data words being transmitted to the first component that match the programmed data pattern.

* * * * *

UNITED STATES PATENT AND TRADEMARK OFFICE
CERTIFICATE OF CORRECTION

| | | |
|---|---|---|
| PATENT NO. | : 7,013,407 B2 | Page 1 of 1 |
| APPLICATION NO. | : 10/038469 | |
| DATED | : March 14, 2006 | |
| INVENTOR(S) | : Johansen et al. | |

It is certified that error appears in the above-identified patent and that said Letters Patent is hereby corrected as shown below:

In column 2, at line 43, delete "black" and insert --block--.

Signed and Sealed this

Thirtieth Day of October, 2007

JON W. DUDAS
*Director of the United States Patent and Trademark Office*